United States Patent
Riedl et al.

(10) Patent No.: US 8,744,273 B2
(45) Date of Patent: Jun. 3, 2014

(54) METHOD AND DEVICE FOR THE OPTICAL TRANSMISSION OF DATA

(75) Inventors: Johannes Riedl, Ergolding (DE); Joachim Walewski, Unterhaching (DE)

(73) Assignee: Siemens Aktiengesellschaft, Munich (DE)

( * ) Notice: Subject to any disclaimer, the term of this patent is extended or adjusted under 35 U.S.C. 154(b) by 429 days.

(21) Appl. No.: 12/920,490

(22) PCT Filed: Feb. 25, 2009

(86) PCT No.: PCT/EP2009/052223
§ 371 (c)(1),
(2), (4) Date: Oct. 26, 2010

(87) PCT Pub. No.: WO2009/112365
PCT Pub. Date: Sep. 17, 2009

(65) Prior Publication Data
US 2011/0052210 A1  Mar. 3, 2011

(30) Foreign Application Priority Data

Mar. 10, 2008  (EP) .................................... 08004419
Sep. 3, 2008  (EP) .................................... 08015569

(51) Int. Cl.
*H04B 10/04* (2011.01)
(52) U.S. Cl.
USPC ........... 398/183; 398/186; 398/189; 398/190; 398/191; 398/130; 398/172
(58) Field of Classification Search
None
See application file for complete search history.

(56) References Cited

U.S. PATENT DOCUMENTS

| 7,570,246 | B2 | 8/2009 | Maniam et al. | 345/102 |
| 2005/0185621 | A1* | 8/2005 | Sivakumar et al. | 370/335 |
| 2006/0239689 | A1* | 10/2006 | Ashdown | 398/130 |
| 2007/0024571 | A1* | 2/2007 | Maniam et al. | 345/102 |
| 2007/0047957 | A1* | 3/2007 | Iio et al. | 398/59 |
| 2007/0104075 | A1 | 5/2007 | Shaanan et al. | 369/116 |
| 2007/0273290 | A1* | 11/2007 | Ashdown et al. | 315/113 |
| 2009/0214225 | A1* | 8/2009 | Nakagawa et al. | 398/191 |
| 2011/0052210 | A1 | 3/2011 | Riedl et al. | 398/189 |

FOREIGN PATENT DOCUMENTS

| CN | 101102143 A | 1/2008 | H04B 7/204 |
| EP | 1 912 354 A1 | 4/2008 | H04B 10/10 |
| JP | 2006325085 A | 11/2006 | |
| JP | 2007043706 A | 2/2007 | |

(Continued)

OTHER PUBLICATIONS

International PCT Search Report, PCT/EP2009/052223, 13 pages, Mailed Feb. 25, 2009.

(Continued)

Primary Examiner — Li Liu
(74) Attorney, Agent, or Firm — King & Spalding L.L.P.

(57) ABSTRACT

In a device and method for the optical transmission of data using a pulse-width-modulated LED (2), a startup phase ascertainment unit (3) for ascertaining at least one startup phase of the LED (2) as a function of a sequence of detected switching states of the LED (2) and a modulation unit (4) for modulating the data to a light signal emitted by the LED (2) during the ascertained startup phase of the LED (2) are provided, and data packets are first deleted from the data packet queue or queues after they have been successfully transmitted.

19 Claims, 3 Drawing Sheets (56) References Cited

FOREIGN PATENT DOCUMENTS

| WO | 02/25842 A2 | 3/2002 | ............ H04B 10/10 |
|---|---|---|---|
| WO | 2006/123697 A1 | 11/2006 | ............ H04B 10/22 |
| WO | WO 2006/123697 | * 11/2006 | ............ H04B 10/22 |
| WO | 2009/112365 A1 | 9/2009 | ............ G08C 23/04 |

OTHER PUBLICATIONS

Sugiyama, H. et al., "Brightness Control Methods for Illumination and Visible-Light Communication Systems," Proceedings of the Third International Conference on Wireless and Mobile Communications (ICWMC07), IEEE, 6 pages, 2007.

* cited by examiner

METHOD AND DEVICE FOR THE OPTICAL TRANSMISSION OF DATA

CROSS-REFERENCE TO RELATED APPLICATIONS

This application is a U.S. National Stage Application of International Application No. PCT/EP2009/052223 filed Feb. 25, 2009, which designates the United States of America, and claims priority to EP Application No. 08004419.1 filed Mar. 10, 2008 and EP Application No. 08015569.0 filed Sep. 3, 2008. The contents of which are hereby incorporated by reference in their entirety.

TECHNICAL FIELD

The invention relates to a method and a device for the optical transmission of data by means of a pulse width modulated light emitting diode.

BACKGROUND

The wide spread of mobile terminal equipment, such as mobile phones for example, requires rapid data transmission by means of wireless interfaces and wireless local data networks. Light emitting diodes (LEDs) can be used in buildings for illuminating rooms. Light emitting diodes are distinguished by low energy consumption, relatively long life and good scalability. For illuminating rooms in buildings, light emitting diodes provided therein are dimmed in order to be able to adjust the illumination level within a room according to the particular requirements.

SUMMARY

According to various embodiments, a method and a device for the optical transmission of data by means of a dimmable light emitting diode can be established.

According to an embodiment, a method for the optical transmission of data by means of a pulse width modulated light emitting diode may comprise: (a) Determination of switch-on phases of the light emitting diode depending on a series of detected switching states of the light emitting diode; and (b) Modulation of the data onto a light signal emitted by the light emitting diode during the determined switch-on phases of the light emitting diode.

According to a further embodiment, the data can be transmitted in data packets. According to a further embodiment, the switching states of the light emitting diode can be sensed by a light sensor. According to a further embodiment, the data can be modulated onto a pulse width modulated carrier signal by means of a modulation unit. According to a further embodiment, the pulse width modulated carrier signal can be generated by a pulse width modulator from a voltage supply signals a function of an adjustable dimming control signal. According to a further embodiment, an expected switch-on phase of the light emitting diode can be determined depending on detected switching times of a pulse width modulated carrier signal. According to a further embodiment, the data can be modulated by means of a modulation unit onto a voltage supply signal depending on a sensor signal of a light sensor. According to a further embodiment, the data signal modulated onto the voltage supply signal can be pulse width modulated by a pulse width modulator as a function of an adjustable dimming control signal. According to a further embodiment, an expected switch-on phase of the light emitting diode can be determined depending on the sensed switching times of the light signal emitted by the light emitting diode. According to a further embodiment, the data packets to be transmitted can be buffered in at least one data packet waiting list. According to a further embodiment, a buffered data packet may be only deleted from the data packet waiting list when its data have been transmitted without errors. According to a further embodiment, the data can be transmitted wirelessly to a mobile terminal. According to a further embodiment, the data can be modulated onto the light signal by switching the pulse width modulated light emitting diode on and off.

According to a further embodiment, a device for the optical transmission of data by means of a pulse width modulated light emitting diode may comprise: (a) a switch-on phase determination unit for determining at least one switch-on phase of a light emitting diode depending on a series of detected switching states of the light emitting diode; and (b) a modulation unit for modulating the data onto a light signal emitted by the light emitting diode during the determined switch-on phase of the light emitting diode.

According to a further embodiment of the device, the switch-on phase determination unit may determine the switch-on phase of the light emitting diode depending on detected switching times of a pulse width modulated carrier signal which is generated by a pulse width modulator from a voltage supply signal as a function of an adjustable dimming control signal. According to a further embodiment of the device, the switch-on phase determination unit may determine the switch-on phase of the light emitting diode depending on switching times of the light signal emitted by the light emitting diode which are sensed by a light sensor.

BRIEF DESCRIPTION OF THE DRAWINGS

Embodiments of the device and of the method for the optical transmission of data by means of a pulse width modulated light emitting diode are described below with reference to the attached figures in order to explain various characteristics.

In the drawings.

DETAILED DESCRIPTION

The various embodiments establish a method for the optical transmission of data by means of a pulse width modulated light emitting diode with the following steps:
   Determination of switch-on phases of the light emitting diode depending on a series of detected switching states of the light emitting diode; and
   Modulation of the data onto a light signal emitted by the light emitting diode during the determined switch-on phases of the light emitting diode.

In an embodiment of the method, the data is transmitted in data packets. This enables a reliable data transmission by means of different data transmission protocols.

In an embodiment of the method, the switching states of the light emitting diode are sensed by a light sensor.

This has the advantage that a failure of the light emitting diode or an impairment of the light signal emitted by the light emitting diode can be detected.

In an embodiment of the method, the data are modulated onto a pulse width modulated carrier signal by means of a modulation unit.

This has the advantage that the emitted light signal can be dimmed between light and dark by the pulse width modulated carrier signal to provide accurate adjustment.

In an embodiment of the method, the pulse width modulated carrier signal is generated by a pulse width modulator from a voltage supply signal as a function of an adjustable dimming control signal.

This has the advantage that the pulse width modulated carrier signal can easily be produced with low circuit complexity.

In an embodiment of the method, at least one of the next expected switch-on phases of the light emitting diode is determined depending on detected switching times of the pulse width modulated carrier signal.

This embodiment has the advantage that a light sensor does not have to be provided to determine the switching states.

In an embodiment of the method, the data are modulated by means of a modulation unit onto a voltage supply signal depending on a sensor signal of a light sensor.

In an embodiment of the method, the data signal modulated onto the voltage supply signal is pulse width modulated by a pulse width modulator as a function of an adjustable dimming control signal.

In an embodiment of the method, at least one of the next expected switch-on phases of the light emitting diode is determined depending on the sensed switching times of the light signal emitted by the light emitting diode.

In an embodiment of the method, the data packets to be transmitted are buffered in at least one queue and/or data packet queue.

A tolerance in respect of fluctuations in the data transmission rates and a flexibility compared with different data transmission rates is hereby achieved.

In one embodiment of the method, a buffered data packet is only deleted from the data packet waiting list when its data have been transmitted without errors.

This advantageously ensures that no data can get lost.

In an embodiment of the method, the data are transmitted optically via a wireless interface.

This has the advantage of high electromagnetic compatibility and robustness with respect to interference signals in the environment.

In an embodiment of the method, the data are modulated onto the emitted light signal by switching on and switching off the pulse width modulated light emitting diode.

This enables the data to be easily modulated onto the signal with low circuit complexity and at a high data transmission rate.

Furthermore, the other embodiments establish a device for the optical transmission of data by means of a pulse width modulated light emitting diode having:

a switch-on phase determination unit for determining at least one switch-on phase of a light emitting diode depending on a series of detected switching states of the light emitting diode; and having a modulation unit for modulating the data onto a light signal emitted by the light emitting diode during the determined switch-on phase of the light emitting diode.

In an embodiment of the device, the switch-on phase determination unit determines the switch-on phase of the light emitting diode depending on detected switching times of a pulse width modulated carrier signal which is generated by a pulse width modulator from a voltage supply signal as a function of an adjustable dimming control signal.

In an alternative embodiment of the device, the switch-on phase determination unit determines the switch-on phase of the light emitting diode depending on sensed switching times of the light signal emitted by the light emitting diode.

Figure 1:
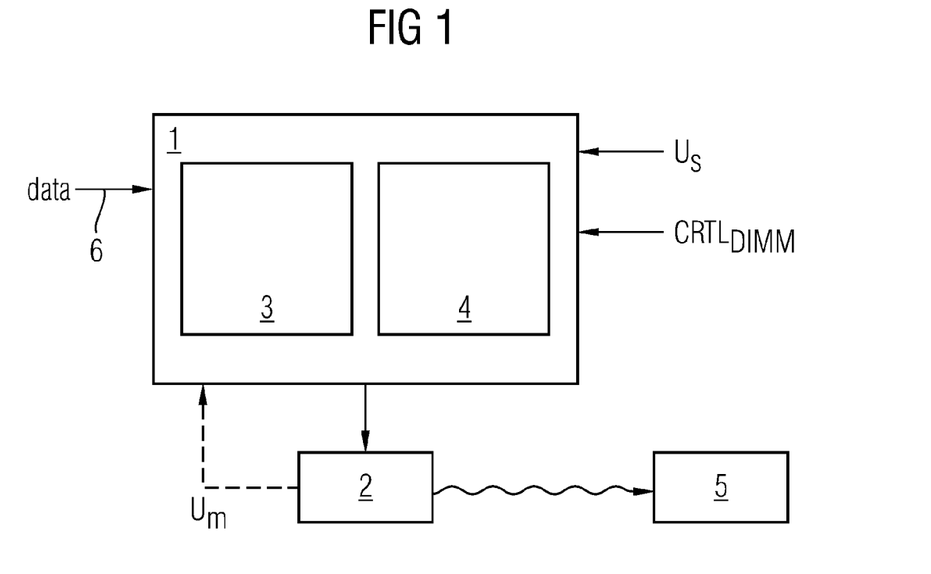
FIG. 1 shows a block diagram of an embodiment of the device for the optical transmission of data by means of a pulse width modulated light emitting diode.

As can be seen from FIG. 1, the device 1 according to various embodiments for the optical transmission of data by means of a pulse width modulated light emitting diode 2 has a switch-on phase determination unit 3 and a modulation unit 4. The device 1 receives data, which are to be transmitted to the device 5, by means of at least one signal line 6. The light emitting diode 2 emits a light signal which is transmitted wirelessly to the further device 5. The device 5 is a portable device, for example, possibly a mobile phone, laptop or PDA. The data to be transmitted originate from one or more data sources which transmit the data directly or via a data network to the device 1. The data are preferably transmitted in data packets, wherein the data format of the data packets can be different. Any data format can be used for the data packets to be transmitted. The data packets are Ethernet data packets or ATM data packets for example. The device 1 receives at least one data stream, which can consist of data packets, via an interface. In a possible embodiment, these data packets are buffered in a FIFO buffer in the form of a data packet waiting list or in a queue. The device 1 for the optical transmission of data is supplied with a voltage supply $U_s$. In addition, the device 1 receives a dimming control signal $CRTL_{Dimm}$ for dimming the light emitting diode 2. The luminous intensity of the light emitting diode 2 is adjusted by means of the dimming control signal for illuminating the environment.

The switch-on phase determination unit 3 determines at least one expected switch-on phase of a light emitting diode 2 depending on a series of detected switching states of the light emitting diode 2. The modulation unit 4 is designed to modulate data onto the light signal emitted by the light emitting diode 2. In doing so, the data are modulated onto the emitted light signal during the switch-on phases of the light emitting diode 2 determined by the switch-on phase determination unit 3.

In order to determine the switch-on phases, the switch-on phase determination unit 3 receives a monitoring signal $U_m$. In an embodiment, the switch-on phase determination unit 3 determines one or more switch-on phases of the light emitting diode 2 depending on detected switching times of a pulse width modulated carrier signal which is generated by a pulse width modulator from the voltage supply signal $U_s$ as a function of the adjustable dimming control signal $CRTL_{Dimm}$.

In an alternative embodiment, the switch-on phase determination unit 3 determines the switch-on phases of the light emitting diode 2 depending on sensed switching times of the light signal emitted by the light emitting diode 2. These switching times of the light signal are sensed by a photodetector for example.

Figure 2:
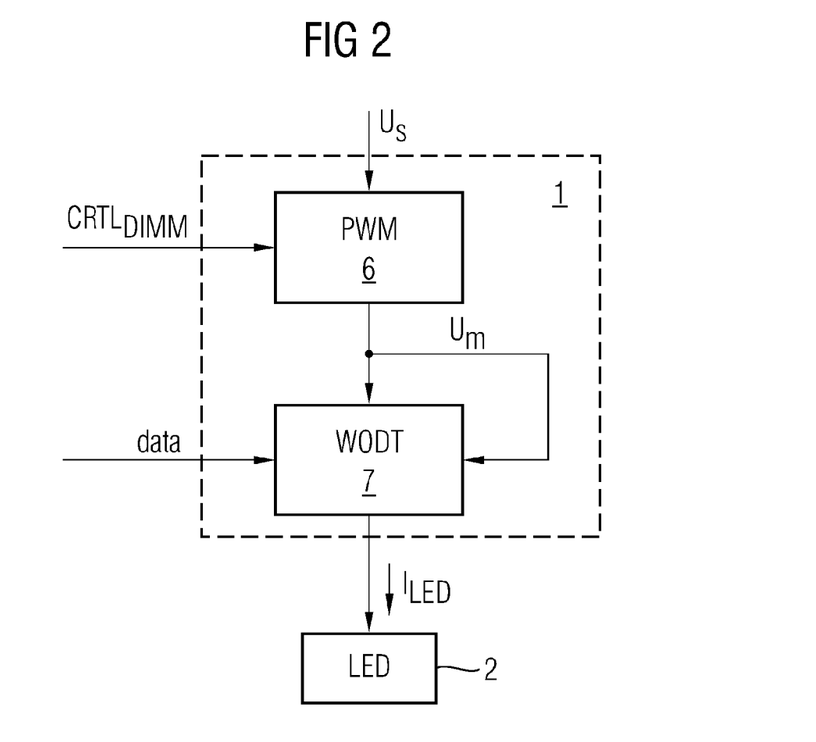
FIG. 2 shows an exemplary embodiment of the device for the optical transmission of data by means of a pulse width modulated light emitting diode.

FIG. 2 shows a first exemplary embodiment of a device 1 for the optical transmission of data by means of a pulse width modulated light emitting diode 2. In the embodiment of FIG. 2, the device contains a pulse width modulator 6 which generates a pulse width modulated carrier signal. The pulse width modulator 6 receives a voltage supply signal $U_s$ and generates a pulse width modulated carrier signal as a function of a dimming control signal CRTL$_{Dimm}$. The voltage supply signal is used to generate the pulse width modulated carrier signal. The control signal CRTL$_{Dimm}$ adjusts the ratio between a phase in which the pulse width modulated signal has a logic high signal level and a phase in which the pulse width modulated signal has a logic low signal level.

The period T$_0$ of the pulse width modulated signal is given by the sum of the switch-on phase T$_{ON}$ and the switch-off phase T$_{OFF}$: T$_0$=T$_{ON}$+T$_{OFF}$.

A dimming factor η specifies the ratio between the switch-off phase T$_{OFF}$ and the period T$_0$:

$$\eta = \frac{T_{OFF}}{T_0}.$$

The emitted optical power P$_{opt}$ of the light emitting diode 2 is proportional to 1−η, i.e.: P$_{opt,LED}$=(1−η)·P$_0$, where P$_0$ represents the transmitted optical power at a dimming factor of 0%.

In the embodiment shown in FIG. 2, expected switch-on phases of the light emitting diode 2 are determined depending on determined switching times of the pulse width modulated carrier signal output by the pulse width modulator 6. In the embodiment shown in FIG. 2, the pulse width modulated carrier signal is used as a monitoring signal U$_m$.

As well as the pulse width modulator 6, the device 1 contains a modulation unit 7 for modulating the data onto a light signal emitted by the light emitting diode 2 during the determined switch-on phases of the light emitting diode 2. In the embodiment shown in FIG. 2, the device 1 contains a WODT (wireless optical data transmission) modulator 7 with a large modulation bandwidth of up to 20 MHz for example. The light radiation emitted by the light emitting diode 2 is varied in order to change the driver current I$_{LED}$ for the light emitting diode 2. The WODT modulator 7 modulates the data onto the light signal emitted by the light emitting diode 2 during the determined switch-on phases of the light emitting diode 2 in accordance with the monitoring signal U$_m$. In doing so, the WODT modulator 7 receives the data to be modulated from appropriate data sources by means of one or more signal lines, preferably in the form of packets. The data are preferably modulated onto the signal by switching on and switching off the pulse width modulated light emitting diode 2 within the determined switch-on phases of the light emitting diode 2.

Figure 3:
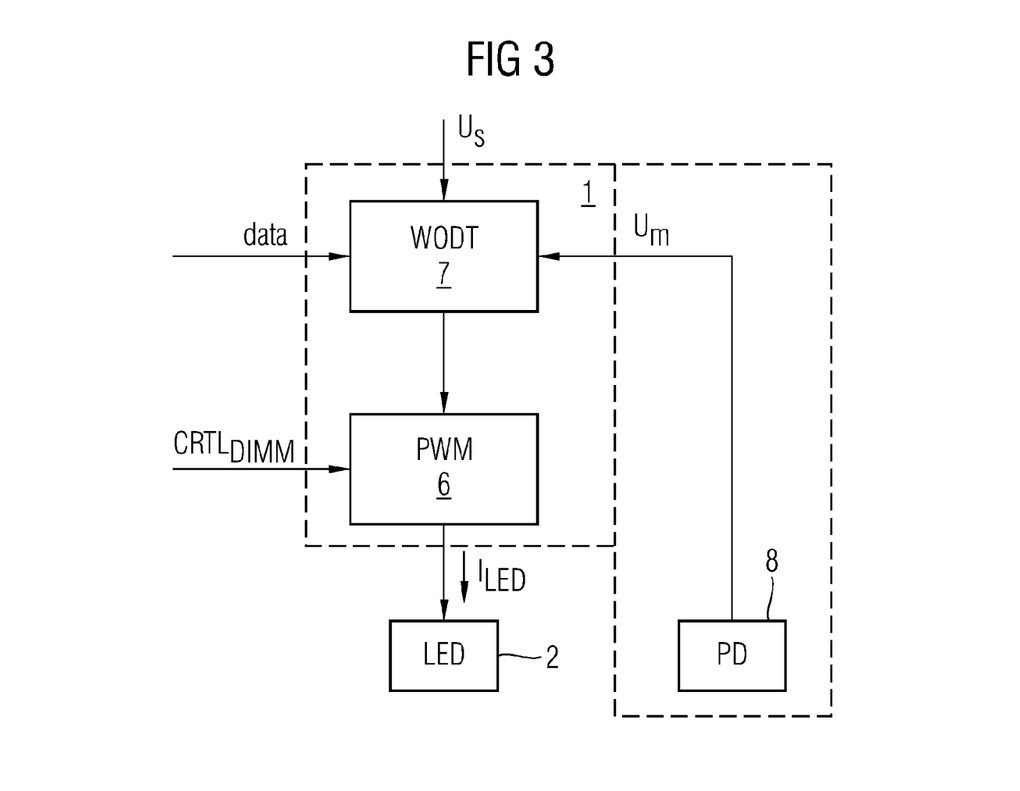
FIG. 3 shows a further exemplary embodiment of a device for the optical transmission of data by means of a pulse width modulated light emitting diode.

FIG. 3 shows an alternative embodiment of the device 1 for the optical transmission of data by means of a pulse width modulated light emitting diode 2. In the embodiment shown in FIG. 3, the device 1 likewise contains a WODT modulator 7 and a pulse width modulator 6. However, in the embodiment shown in FIG. 3, the pulse width modulator 6 is connected after the WODT modulator 7. In addition, in the embodiment shown in FIG. 3, the device 1 has a sensor 8 which senses the switching states of the light emitting diode 2. The sensor 8 is a photodetector for example. In the embodiment shown, the data are modulated onto the voltage supply signal U$_s$ by the WODT modulator 7 depending on a sensor signal U$_m$ of the light sensor 8. The data signal modulated by the voltage supply signal U$_s$ is then pulse width modulated by the pulse width modulator 6 as a function of an adjustable dimming control signal CRTL$_{Dimm}$. A sensor 8 can be any light sensor, for example a photodiode. In a possible embodiment, the pulse width modulator 6 and the light emitting diode 7 form an integrated component. In a similar manner, in the embodiment shown in FIG. 2, the WODT modulator 7 can form an integrated component with the light emitting diode 2.

Figure 4:
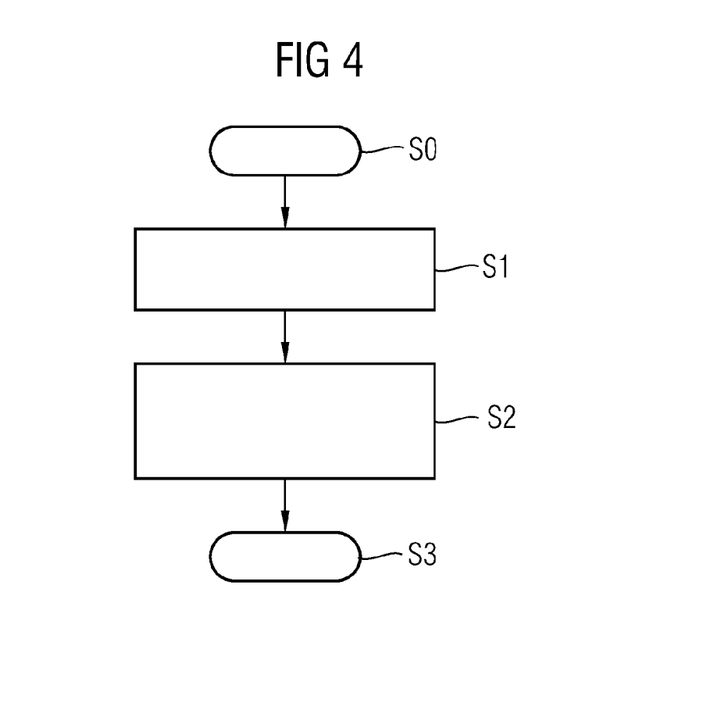
FIG. 4 shows a flow diagram of the method for the optical transmission of data by means of a pulse width modulated light emitting diode.

FIG. 4 shows a simple flow diagram of the method according to various embodiments for the optical transmission of data by means of a pulse width modulated light emitting diode 2. Following the start in step S0, future switch-on phases of the light emitting diode 2 are determined in a step S2 depending on a series of detected switching states of the light emitting diode 2. These switching states are switching states of the light emitting diode 2 which it has assumed in the past. In a possible embodiment, at least one of the next or future expected switch-on phases of the light emitting diode 2 is determined depending on detected switching times of a pulse width modulated carrier signal. In an alternative embodiment, the next expected switch-on phases of the light emitting diode 2 are determined depending on the sensed switching times of the light signal emitted by the light emitting diode 2. In a possible embodiment, the switch-on phases are calculated by means of a calculation unit depending on the switching times. The calculation unit is a microprocessor for example.

In a further step S2, the data to be transmitted are subsequently modulated onto a light signal emitted by the light emitting diode 2 during the determined switch-on phases of the light emitting diode 2. The method ends in step S3.

Figure 5A:
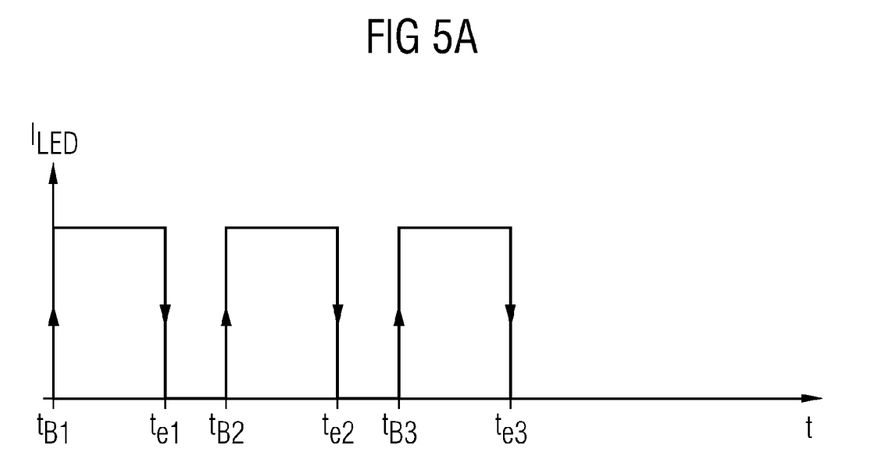
FIG. 5a,5b show signal diagrams to explain the way of working of the method for the optical transmission of data by means of a pulse width modulated light emitting diode.
Figure 5B:
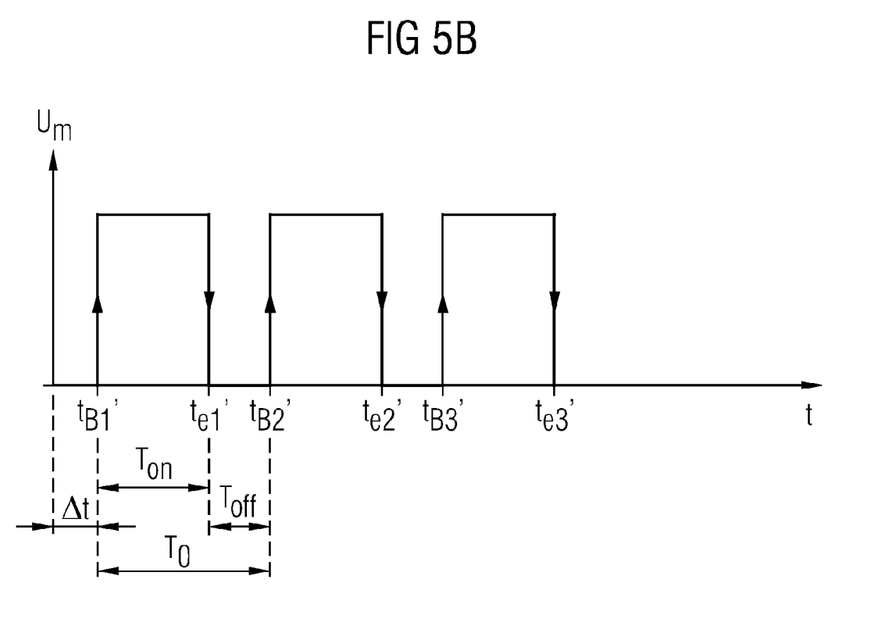

FIGS. 5A and 5B show signal diagrams to explain the approach used in the method according to various embodiments for the transmission of data.

FIG. 5A shows a driver current I$_{LED}$ for the light emitting diode 2. FIG. 5B shows the monitoring signal U$_m$ which is used to determine future switch-on phases of the light emitting diode 2. In the example shown, three switch-on phases of the light emitting diode 2 are shown. A switch-on phase begins at a time T$_b$ and ends at a time T$_e$. The start of the third switch-on phase of the light emitting diode T$_{b3}$ can be calculated from the monitoring signal U$_m$ as follows:

For a constant dimming control signal, the period T$_0$ is calculated as follows:

$$T_0 = t_{b2'} - t_{b1'}.$$

The duration of the switch-on phase T$_{ON}$ is given as follows:

$$T_{ON} = t_{e1'} - t_{b1'}.$$

The time offset Δt between the current signal I$_{LED}$ and the monitoring signal U$_m$ is constant and known. Therefore, the starting time of the next switch-on phase, i.e. the third switch-on phase, is given by:

$$t_{b3} = t_{b2'} - \Delta t + T_0.$$

For the end time of the third or next switch-on phase of the light emitting diode, the following applies:

$$t_{e3} = t_{b3} + T_{ON}.$$

In the method according to various embodiments, the next or third switch-on phase of the light emitting diode 2 is determined from the series of detected switching states of the light emitting diode 2, i.e. from the monitoring signal which represents the first and second switch-on phase of the light emitting diode 2. The data to be transmitted are then modulated onto the light signal during this determined third switch-on phase of the light emitting diode 2. If the time offset Δt is fully known or even if it is unknown but shorter than the duration of a data symbol, the WODT modulator 7 recognises the start time t$_{bj}$ and the end time t$_{ej}$ for each section of the PWM modulated signal, i.e. the start and end time of the switch-on phase. From these, the start and end times of the future switch-on phases of the pulse width modulated light emitting diode 2 can be calculated. If only one data packet queue is serviced for the device 1, i.e. only data of one transmission class is present, the data blocks $L_1$ to $L_j$ in the data packet waiting list can be transmitted taking into account the following condition:

$$t_{empty,j} + \frac{B_S}{M_S}\sum_{l=1}^{r_j} L_l \le t_{e,j} - t_{b,j} = T_{on,j},$$

where $M_S$ represents the symbol rate,
$L_i$ represents the bit length of the data block or data packet i,
$M_S$ represents the dual logarithm of the number of signal levels of a data symbol,
$T_{on,j}$ represents the duration of the switch-on phase of a time section j,
$r_j$ represents the highest packet number of the data packet to be transmitted during a PWM time section j, and
$t_{empty,j}$ represents the time between $t_{b,j}$ and $t_{e,j}$ for which the waiting list is empty.

In a possible embodiment, no preliminary calculation of the switch-on phases is carried out in order to modulate the data onto the emitted light signal during these switch-on phases, but the data are transmitted as follows.

During the assumed switch-on phase, i.e. between the start time $t_{b,j}$ and the end time $t_{e,j}$, a check is first carried out to determine whether there is a data packet in the waiting list or queue. If this is the case, the data packet is transmitted, i.e. the data of the data packet are modulated onto the light signal emitted by the light emitting diode 2 during the switch-on phase. The last data packet transmitted is held in the memory or queue until it has been established that the transmission of the data packet is completely finished, i.e. that no switch-off phase has occurred during the transmission of the data packet. This is necessary particularly because of the time delay $\Delta t$ between the optical output signal and the monitoring signal $U_m$. The data packets, the data of which have been successfully transmitted to the mobile unit 5, can then be deleted. The data packet waiting list is serviced until $t_{e,j}$ is reached. Between the times $t_{e,j}$ and $t_{b,j+1}$ incoming data packets are sorted into the data packet waiting list and transmitted during the next switch-on phase.

The dimming of the light signal as a function of the dimming control signal $CRTL_{Dimm}$ has the following effects on the data transmission. If the dimming factor η decreases, the duration of the switch-on phase $T_{ON}$ increases. Because of the increasing duration of the switch-on phase, the time available for transmitting data of the data packets increases, i.e. the data packet transmission is not negatively affected by the dimming process. If, on the other hand, the dimming factor η increases, so that the duration of the switch-on phase $T_{ON}$ decreases, this can lead to a loss of packets. If, however, the next switch-on phase can be recognized and the lost data packet is still available, i.e. available in the data packet waiting list, in a possible embodiment the data packet can be retransmitted during the next switch-on phase.

If the delay time $\Delta t$ is known with an accuracy σ, the transmission can likewise be carried out taking into account the above equation, wherein, however, $t_{b,j}$ must be replaced by $t_{b,j}+n\cdot\sigma$, where n≥1 can be chosen in a suitable way to ensure a high reliability of the switch-on phase of the pulse modulated signal having begun at this time. In a similar way, $t_{e,j}$ must be replaced by $t_{e,j}-n\cdot\sigma$ and $T_{onj}$ by $T_{onj}-2n\cdot\sigma$. The larger n is chosen to be, the smaller the probability that a data packet will be transmitted during a time in which the light emitting diode 2 is in reality switched off. Conversely, the number n must not be chosen to be too large, as otherwise the efficiency of the data transmission will be too low.

The approach described above is possible regardless of whether the device 1 receives a return or feedback signal from the mobile terminal unit 5. In a possible embodiment, the device 1 receives a return or feedback signal as to whether a data packet has been fully transmitted or not via a separate message transmission channel. In this embodiment, the data packets can be assigned a monotonically increasing frame or packet number for example. In addition, in a possible embodiment, the receiver or mobile unit 5 can demand retransmission of a missing or faulty data packet.

In a possible embodiment, the device 1 according to various embodiments for the transmission of data receives data packets from different data sources which wait for transmission in different data packet waiting lists. In this embodiment, the device 1 additionally has a so-called "scheduler" which manages the different data packet waiting lists or queues. Between the time $t_{b,j}$ and $t_{e,j}$, this scheduler identifies which data packet waiting list is to be served next. The scheduler then checks whether a data packet is present in the selected data packet queue or not. If a data packet is present, the device 1 starts transmitting data packets from the appropriate queue or data packet waiting list. In doing so, the last data packet transmitted is held in the memory until the data packet has been transmitted without errors. Only those data packets whose data have been successfully transmitted to the mobile terminal unit 5 are deleted. The process is repeated until the time $t_{e,j}$ is reached.

Data packets arriving between the times $t_{e,j}$ and $t_{b,j+1}$ are sorted into the appropriate data packet waiting lists and transmitted during the next transmission period.

The method according to various embodiments is not only suitable for the optical transmission of data within data packets, but also for the transmission of data in continuous data streams.

In a possible embodiment of the method, the average optical power of the emitted light signal is kept constant during the modulation. In the transmission method according to various embodiments, a high data transmission rate with simultaneous dimming of the light emitting diode 2 can be achieved. In general, bit rates or data transmission rates in the region of the transmission rate at reference power $P_0$ (i.e. a dimming factor of 0%)·a factor (1−η) can be achieved. For example, at a dimming factor of 30% the data rate can approach 70% of the data rate which is achievable at 100% illumination. The data to be transmitted are data from any applications, for example multimedia data possibly for audio applications.

The method according to various embodiments for the optical transmission of data does not generate any electromagnetic waves, and also cannot be affected by electromagnetic waves. The method according to various embodiments can be used in particular when LED lighting is already provided. In doing so, the light emitting diodes can be addressed with Powerline example.

Data are transmitted by means of an easily screened communications medium. As the data are transmitted optically, they can easily be screened with a wall or curtain for example. Protection against eavesdropping can therefore be achieved.

In a possible embodiment, the light signal radiated from the light emitting diode 2 is aligned in the form of a cone. By this means, a relatively small cell size can be formed, which enables individual and high-bit-rate communication. The method according to various embodiments allows reliable optical transmission of data via a dimmable light emitting diode 2 to portable terminal units 5 within an illuminated room, and is insensitive to radio signals. Any light emitting diodes 2 can be used, for example light emitting diodes which generate white light. Light emitting diodes with a lower modulation bandwidth than white light emitting diodes can also be used.

What is claimed is:

1. A method for the optical transmission of data by means of a pulse width modulated light emitting diode comprising:
    detecting switching states of the light emitting diode with a light sensor;
    determining predicted future switch-on phases of the light emitting diode responsive to series of detected switching states of the light emitting diode; and
    modulating the data onto a light signal emitted by the light emitting diode during the determined predicted future switch-on phases of the light emitting diode.

2. The method according to claim 1, wherein the data is transmitted in data packets.

3. The method according to claim 1, wherein the data are modulated onto a pulse width modulated carrier signal by means of a modulation unit.

4. The method according to claim 3, wherein the pulse width modulated carrier signal is generated by a pulse width modulator from a voltage supply signal as a function of an adjustable dimming control signal.

5. The method according to claim 4, wherein an expected switch-on phase of the light emitting diode is determined depending on detected switching times of a pulse width modulated carrier signal.

6. The method according to claim 1, wherein the data are modulated by means of a modulation unit onto a voltage supply signal depending on a sensor signal of a light sensor.

7. The method according to claim 6, wherein the data signal modulated onto the voltage supply signal is pulse width modulated by a pulse width modulator as a function of an adjustable dimming control signal.

8. The method according to claim 7, wherein an expected switch-on phase of the light emitting diode is determined depending on the sensed switching times of the light signal emitted by the light emitting diode.

9. The method according to claim 1, wherein the data packets to be transmitted are buffered in at least one data packet waiting list.

10. The method according to claim 9, wherein a buffered data packet is only deleted from the data packet waiting list when its data have been transmitted without errors.

11. The method according to claim 1, with the data being transmitted wirelessly to a mobile terminal.

12. The method according to claim 1, with the data being modulated onto the light signal by switching the pulse width modulated light emitting diode on and off.

13. A device for the optical transmission of data by means of a pulse width modulated light emitting diode comprising:
    a light sensor for detecting switching states oldie light emitting diode;
    a switch-on phase determination unit for determining at least one predicted future switch-on phase of a light emitting diode responsive to a series of detected switching states of the light emitting diode; and having
    a modulation unit for modulating the data onto a light signal emitted by the light emitting diode during the determined predicted future switch-on phase of the light emitting diode.

14. The device according to claim 13, wherein the switch-on phase determination unit determines the switch-on phase of the light emitting diode depending on detected switching times of a pulse width modulated carrier signal which is generated by a pulse width modulator from a voltage supply signal as a function of an adjustable dimming control signal.

15. A system for the optical transmission of data by means of a pulse width modulated light emitting diode comprising:
    a puke width modulator receiving a pulse width modulation control signal and outputting a pulse width modulated carrier signal;
    a data modulator receiving said puke width modulated carrier signal and configured to generate an output signal by modulating a data signal onto said puke width modulated carrier signal during switch on phases of the pulse width modulated carrier signal; and
    at least one light emitting diode receiving the output signal of said data modulator;
    wherein switching states of the light emitting diode are sensed by a light sensor;
    wherein an expected switch-on phase of the light emitting diode is determined responsive to detected switching times of the pulse width modulated carrier signal.

16. The system according to claim 15, wherein the data signal is transmitted in data packets.

17. A method for the optical transmission of data by means of a pulse width modulated light emitting diode comprising:
    detecting switching states of the light emitting diode with a light sensor;
    determining switch-on phases of the light emitting diode responsive to series of detected switching states of the light emitting diode; and
    modulating the data onto a light signal emitted by the light emitting diode during the determined switch-on phases of the light emitting diode;
    wherein the pulse width modulated carrier signal is generated by a pulse width modulator from a voltage supply signal as a function of an adjustable dimming control signal; and
    wherein an expected switch-on phase of the light emitting diode is determined depending on detected switching times of a pulse width modulated carrier signal.

18. A method for the optical transmission of data by means of a pulse width modulated light emitting diode comprising:
    detecting switching states of the light emitting diode with a light sensor;
    determining switch-on phases of the light emitting diode responsive to series of detected switching states of the light emitting diode; and
    modulating the data onto a light signal emitted by the light emitting diode during the determined switch-on phases of the light emitting diode;
    wherein the data are modulated by means of a modulation unit onto a voltage supply signal depending on a sensor signal of a light sensor;
    wherein the data signal modulated onto the voltage supply signal is pulse width modulated by a pulse width modulator as a function of an adjustable dimming control signal;
    wherein an expected switch-on phase of the light emitting diode is determined depending on the sensed switching times of the light signal emitted by the light emitting diode.

19. A device for the optical transmission of data by means of a pulse width modulated light emitting diode comprising:
    a light sensor for detecting switching states of the light emitting diode;
    a switch-on phase determination unit for determining at least one switch-on phase of a light emitting diode responsive to a series of detected switching states of the light emitting diode; and having a modulation unit for modulating the data onto a light signal emitted by the light emitting diode during the determined switch-on phase of the light emitting diode;

wherein the switch-on phase determination unit determines the switch-on phase of the light emitting diode depending on detected switching times of a pulse width modulated carrier signal which is generated by a pulse width modulator from a voltage supply signal as a function of an adjustable dimming control signal.

* * * * *